United States Patent
Gudapati

(10) Patent No.: US 12,509,104 B2
(45) Date of Patent: Dec. 30, 2025

(54) METHOD FOR MANAGING MOBILITY AND CUSTOMER INTERFACE FUNCTIONS ON ELECTRIFIED VEHICLES WITH AXLE DISCONNECT AND E-SECUREMENT SYSTEMS

(71) Applicant: FCA US LLC, Auburn Hills, MI (US)

(72) Inventor: Abhilash Gudapati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 136 days.

(21) Appl. No.: 18/479,490

(22) Filed: Oct. 2, 2023

(65) Prior Publication Data
US 2025/0108820 A1   Apr. 3, 2025

(51) Int. Cl.
*B60Q 1/00*     (2006.01)
*B60W 10/18*    (2012.01)
(Continued)

(52) U.S. Cl.
CPC .......... *B60W 50/14* (2013.01); *B60W 10/182* (2013.01); *B60W 40/076* (2013.01);
(Continued)

(58) Field of Classification Search
CPC .......... B32B 17/10174; B32B 17/1022; B32B 17/10513; B32B 17/10541; B32B 17/10733; B32B 17/10761; B32B 17/10798; B32B 2307/416; B32B 2551/08; B32B 2605/08; B32B 7/14; B60R 1/088; B60R 1/12; B60R 1/1207; B60R 2001/1215; B60R 16/0236; B60R 1/00; B60R 3/00; B60R 5/00; B60R 7/00; B60R 9/00; B60R 11/00; B60R 13/00; B60R 15/00; B60R 16/00; B60R 17/00; B60R 19/00; B60R 21/00; B60R 22/00;
(Continued)

(56) References Cited

U.S. PATENT DOCUMENTS

| | | | |
|---|---|---|---|
| 6,779,636 B2 * | 8/2004 | Fleming | B60T 7/045 340/453 |
| 2002/0161820 A1 * | 10/2002 | Pellegrino | H04L 67/10 709/201 |

(Continued)

FOREIGN PATENT DOCUMENTS

| | | |
|---|---|---|
| FR | 3123284 A1 | 12/2022 |
| FR | 3133042 A1 | 9/2023 |

OTHER PUBLICATIONS

International Search Report and Written Opinion dated Jan. 16, 2025 for International Application No. PCT/US2024/049366, International Filing Date Oct. 1, 2024.

*Primary Examiner* — Daniel Previl
(74) *Attorney, Agent, or Firm* — Jeremy J. Klobucar

(57) ABSTRACT

A method of operating an electrified vehicle having a front axle disconnect is provided. A powertrain supervisor controller determines that the electrified vehicle needs to be secured due to an internal reason. The powertrain supervisor controller determines whether a front axle status is one of faulted or disengaged. The powertrain supervisor controller requests, based on the front axle status being faulted, engagement of an electronic park brake when securement conditions are active. A message indicative of a front axle disconnect status is displayed at a human machine interface.

11 Claims, 7 Drawing Sheets

(51) Int. Cl.
*B60W 40/076* (2012.01)
*B60W 50/02* (2012.01)
*B60W 50/14* (2020.01)

(52) U.S. Cl.
CPC ... *B60W 50/0205* (2013.01); *B60W 2050/146* (2013.01); *B60W 2552/15* (2020.02); *B60W 2555/20* (2020.02)

(58) Field of Classification Search
CPC ..... B60R 25/00; B60R 99/00; B60R 2225/00; B60R 2300/00; B60R 2325/00; G02F 1/157; G02F 2001/1536; G02F 1/00; G02F 2/00; G02F 3/00; G02F 7/00; G02F 2201/00; G02F 2202/00; G02F 2203/00; G02F 2413/00; B60W 2555/20; B60W 2040/0809; B60W 2040/0872; B60W 2050/0075; B60W 2540/22; B60W 2552/00; B60W 2554/00; B60W 2556/10; B60W 2710/1044; B60W 2710/18; B60W 2720/10; B60W 30/143; B60W 40/04; B60W 40/08; B60W 40/09; B60W 10/182; B60W 2050/146; B60W 2510/188; B60W 2552/15; B60W 2710/186; B60W 30/18118; B60W 40/076; B60W 50/0205; B60W 50/14; B60W 10/00; B60W 20/00; B60W 30/00; B60W 40/00; B60W 50/00; B60W 60/00; B60W 2300/00; B60W 2400/00; B60W 2420/00; B60W 2422/00; B60W 2510/00; B60W 2520/00; B60W 2530/00; B60W 2540/00; A61B 5/02055; A61B 5/024; A61B 5/0531; A61B 5/4845; G01C 21/3415; G01C 21/3469; G01C 21/3608; G01C 21/3617; G01C 21/3655; G01C 21/3667; G01C 21/3682; G05D 1/0011; G06F 16/29; G06N 20/00; G06N 3/00; G06N 5/00; G06N 7/00; G06N 10/00; G06N 99/00; G06Q 20/102; G06Q 2240/00; G06Q 30/0283; G06Q 40/08; G06Q 50/40; G07B 15/00; G07B 15/063; G07C 5/008; H04B 1/3822; H04B 7/18504; G08G 1/00; G08G 1/0112; G08G 1/012; G08G 1/0129; G08G 1/0133; G08G 1/0141; G08G 1/0145; G08G 1/065; G08G 1/07; G08G 1/093; G08G 1/0962; G08G 1/0965; G08G 1/0967; G08G 1/096725; G08G 1/096741; G08G 1/096775; G08G 1/096791; G08G 1/096811; G08G 1/096822; G08G 1/096838; G08G 1/097; H04L 67/02; H04L 67/306; H04L 9/3247; H04M 15/60; H04W 12/08; H04W 4/024; H04W 4/029; H04W 4/40; H04W 4/42; H04W 4/48; H04W 4/50
USPC .... 340/438, 435–436, 441, 449, 453, 457.3, 340/461, 488, 525, 534, 680, 691.6
See application file for complete search history.

(56) References Cited

U.S. PATENT DOCUMENTS

| | | | |
|---|---|---|---|
| 2003/0136597 A1* | 7/2003 | Raftari | B60K 6/445 180/242 |
| 2011/0224858 A1* | 9/2011 | Bissontz | B60K 28/165 180/65.265 |
| 2011/0301780 A1* | 12/2011 | Miller | H04M 1/67 701/1 |
| 2017/0240038 A1* | 8/2017 | Spangler | B60W 10/119 |
| 2018/0264948 A1* | 9/2018 | Matsuo | B60L 3/06 |

* cited by examiner

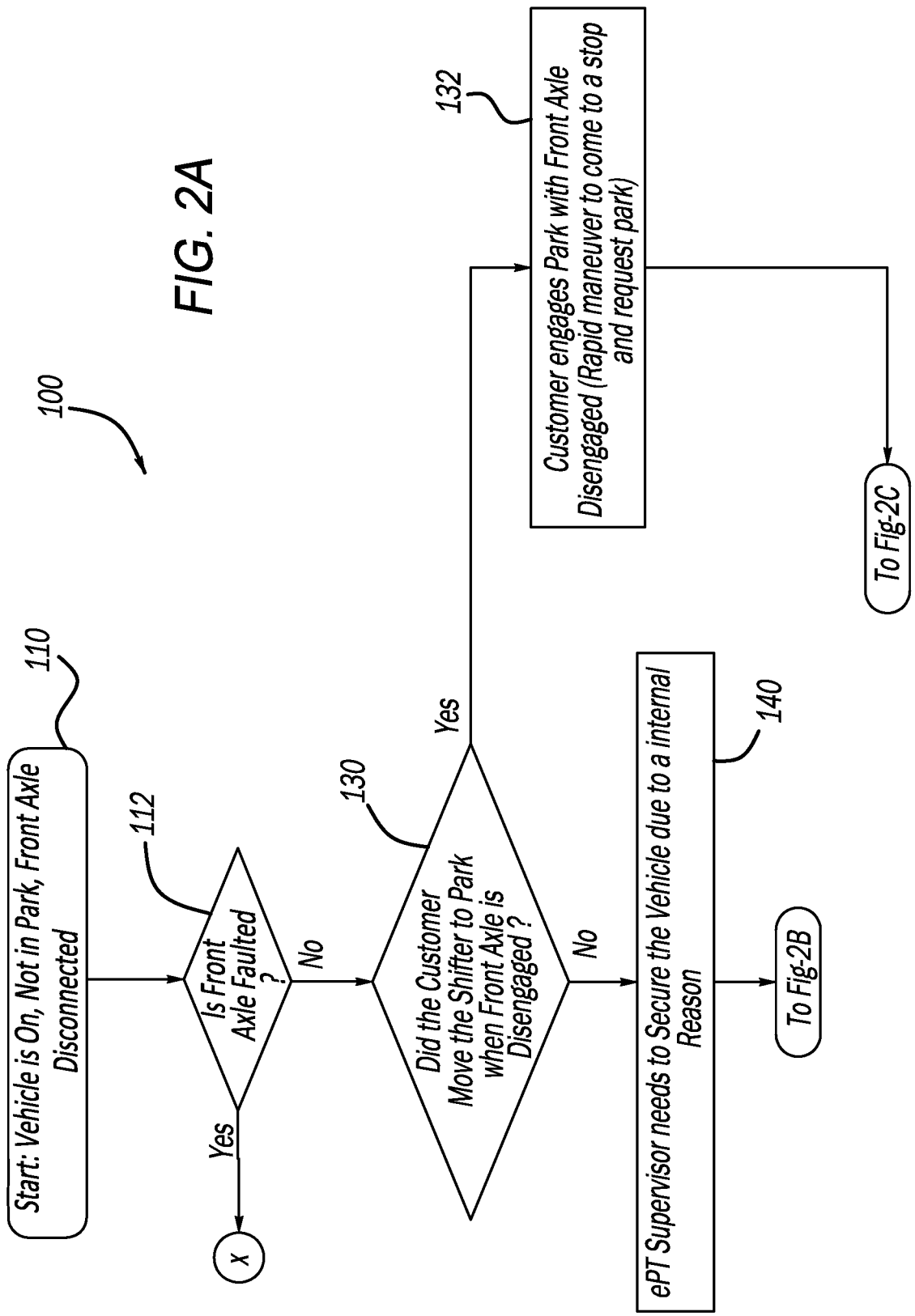

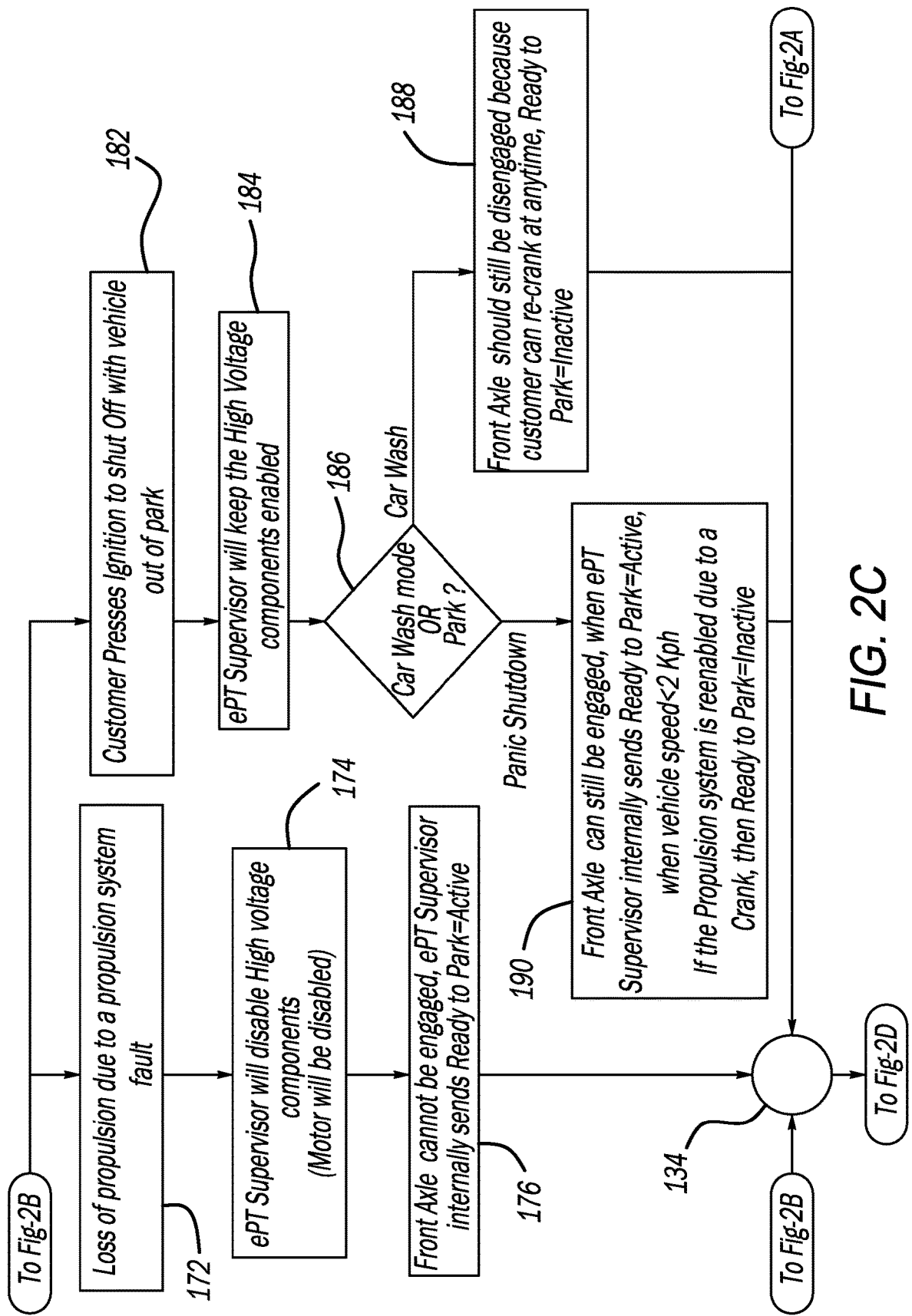

METHOD FOR MANAGING MOBILITY AND CUSTOMER INTERFACE FUNCTIONS ON ELECTRIFIED VEHICLES WITH AXLE DISCONNECT AND E-SECUREMENT SYSTEMS

FIELD

The present application relates generally to electrified vehicles having front axle disconnect systems that are used to disconnect the front motor to improve vehicle range.

BACKGROUND

Wheel end disconnect (WED) or front axle disconnect (FAD) systems are used to disconnect the front motor of a front electric drive module to improve vehicle efficiency. In some scenarios, the WED or FAD systems cannot be engaged due to a number of failure modes. Example failure modes can include, but are not limited to, an electrical fault in a solenoid circuit of the WED, a mechanical breakage within the WED, debris or sticking within the WED, or failure of the FAD. In such scenarios, the vehicle may be incompletely secured even if the park pawl (associated with the front axle of the vehicle) is physically engaged when the WED or FAD is in an open state. Accordingly, while such systems do work for their intended purpose, there remains a need for improvement in the relevant art.

SUMMARY

According to an example aspect of the invention, a method of operating an electrified vehicle having a front axle disconnect is provided. A powertrain supervisor controller determines that the electrified vehicle needs to be secured due to an internal reason. The powertrain supervisor controller determines whether a front axle status is one of faulted or disengaged. The powertrain supervisor controller requests, based on the front axle status being faulted, engagement of an electronic park brake when securement conditions are active. A message indicative of the front axle disconnect status such as "the park on shifter and cluster is not achieved" is displayed at a human machine interface.

In some implementations, signals from sensors indicative of one of a grade and a temperature are received at the powertrain supervisor controller. A determination is made, at the powertrain supervisor controller, whether the grade is above a grade threshold and the temperature is below a temperature threshold. A message indicative of icy roads instructing the electrified vehicle to be parked on a flat surface is displayed at the human machine interface based on a determination that the grade is above the grade threshold and the temperature is below the temperature threshold.

In some implementations, a determination is made, at the powertrain supervisor controller, whether the front axle is engaged before the electronic park brake is engaged. Park is engaged at the powertrain supervisor controller. A message indicative of "vehicle not in park" is displayed at the human machine interface.

In other implementations, the powertrain supervisor controller requests, based on the front axle status being disengaged, engagement of the electronic park brake when securement conditions are active. A message indicative of "the vehicle not in park condition" is displayed at the human machine interface.

According to some implementations, the powertrain supervisor controller determines whether the electronic park brake is engaged with no faults. A message indicative of "braking the vehicle to prevent the vehicle from rolling" is displayed at the human machine interface based on a fault being determined.

According to other implementations, the internal reason comprises the electric vehicle supply equipment connected to the electrified vehicle while not in park, According to other implementations, the internal reason comprises automated driving assistance system requests for securement.

According to other implementations, the internal reason comprises a vehicle operator exits the electrified vehicle without the electrified vehicle in park.

According to other implementations, the internal reason comprises a loss of propulsion due to a propulsion system fault.

According to other implementations, the internal reason comprises a vehicle operator presses ignition to shut off the electrified vehicle with the electrified vehicle out of park.

According to another example aspect of the invention, a control system for operating an electrified vehicle is provided. The control system includes a front axle disconnect that selectively engages and disengages relative to a front drive axle of the electrified vehicle. A human machine interface is configured to display messages to a vehicle operator based on operating status of the front axle disconnect, such as a failure of the system. An electronic park brake is provided. A powertrain supervisor controller is configured to determine that the electrified vehicle needs to be secured due to an internal reason, determine whether a status of the front axle disconnect is one of faulted or disengaged; requesting, based on the front axle disconnect status being faulted engagement of the electronic park brake; and communicating a signal to the human machine interface to display a message indicative of "the vehicle not in park condition".

In other implementations, sensors are provided including a grade sensor that senses a grade and a temperature sensor that senses a temperature, wherein the powertrain supervisor controller receives the sensed grade and temperature and is further configured to display at the human machine interface, a message indicative of icy roads instructing the electrified vehicle to be parked on a flat surface, based on the sensed grade being above a grade threshold and the sensed temperature being below a temperature threshold.

In other implementations, the powertrain supervisor controller determines whether the front axle disconnect is engaged before the electronic park brake is engaged and communicates a signal to the human machine interface to display a message indicating of "park status not achieved".

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 2A-2F illustrate a flow diagram of an example control of the system shown in FIG. 1, in accordance with the principles of the present disclosure.

DETAILED DESCRIPTION

Wheel end disconnect (WED) or front axle disconnect (FAD) systems are used to disconnect the front motor of a front electric drive module to improve vehicle efficiency. In some scenarios, the WED or FAD systems cannot be engaged due to a number of failures. Example failures can include, but are not limited to, an electrical fault in a solenoid circuit of the WED, a mechanical breakage within the WED, debris or sticking within the WED, or failure of the FAD. In such scenarios, the vehicle will be incompletely secured even if the park pawl (associated with the front axle of the vehicle) is physically engaged when the WED or FAD is in an open state. A vehicle securement system has a method to secure the vehicle by requesting an electronic park brake (associated with the rear axle of the vehicle), to be engaged when there is a fault in the park pawl. The system currently is expected to use the same methodology of applying the electronic park brake to secure the vehicle. For clarity, the terms WED and FAD are used herein interchangeably to generally denote a system that connects and disconnects a front electric motor to front drive wheels.

Challenges arise due to the park pawl and the WED or FAD being associated with the same axle (front axle in this example). In this regard, if the wheels (front wheels in this example) are disconnected from the drivetrain, even if the park pawl is applied, the vehicle can roll away (such as when left on a grade). In addition, if there is a WED or FAD failure, the possibility of roll away is also elevated.

It is desirable to gain the most efficiencies out of the WED or FAD by not reengaging it regularly so as not to cause unnecessary wear and tear onto the WED or FAD. Moreover, each time the WED or FAD is reengaged, an additional noise vibration and harshness (NVH) component can be introduced into the system that may be perceived by the driver.

Figure 1:
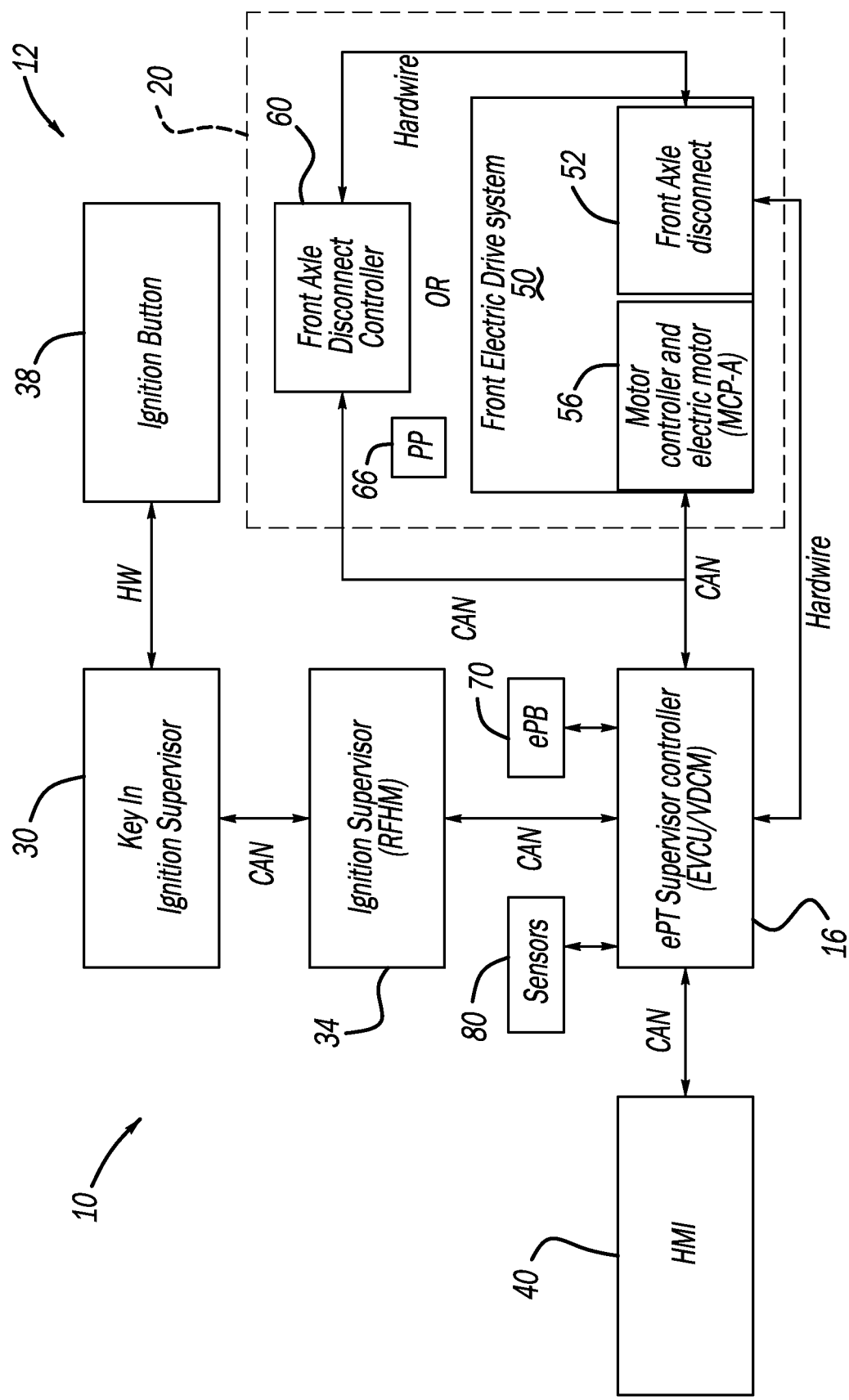
FIG. 1 is a schematic diagram of an example system for controlling an axle disconnect for an electrified vehicle in accordance with the principles of the present disclosure.

With initial reference to FIG. 1, a system for controlling an axle disconnect is shown and generally identified at reference 10. The system 10 is shown implemented on an electrified vehicle 12 and generally includes main vehicle components including a powertrain supervisory controller (electric vehicle control unit, EVCU/vehicle dynamic control module, VDCM) 16 and a front axle disconnect system 20. In examples, the front axle disconnect system 20 can be controlled by the powertrain supervisory controller 16 or other standalone controller. The system 10 can further include an ignition supervisor 30, a radio frequency hub module (RFHM) Key in ignition supervisor 34 and an ignition button 38. The powertrain supervisory controller 16 can communicate signals with a human machine interface (HMI) 40 that identifies messages to a vehicle user as will be described herein. The powertrain supervisory controller 16 can also communicate with an electronic park brake 70. In examples, the electronic park brake 70 can be associated with a rear axle of the vehicle 12.

The front axle disconnect system 20 can include a front electric drive system 50 having a front axle disconnect 52 and a motor controller and electric motor (MCP-A) 56. The front axle disconnect 52 can be controlled by a front axle disconnect controller 60. A park pawl 66 is provided on the front axle disconnect system 20. Vehicle sensors 80 can communicate various operating conditions to the powertrain supervisory controller 16 such as, but not limited to, a grade and temperature measurement.

First challenges will now be discussed. For achieving the best systemic efficiency and avoid NVH issues during re-engagement, the system 10 can choose to re-engage the FAD 52 at a very low speed (such as calibratable between 8-15 kmph, or other speeds) or even at zero vehicle speed. Engaging the FAD 52 at low speeds can cause its own inefficiency and possibly wear and tear of the components such as if the driver operational use case is directed toward "stop and go" traffic where the FAD 52 can be constantly engaged and disengaged, when the vehicle can constantly go above and below the selected re-engagement thresholds. In this regard, a better method to ensure the FAD 52 is re-engaged and securement is achieved such that ignition 30 can go to an "OFF" state is desired. In other examples, the FAD 52 can be engaged at high speeds as well based on the driver requested torque demand or customer request to change to a high performance drive mode. The system 10 can choose to engage at low speeds to ensure the vehicle 12 can be secured as the intent to slow down may be to stop and shut down the vehicle 12.

In other operating scenarios, such as driving through a car wash, or where it is not necessary to wait until zero speed (calibratable between 8-15 kmph), where the vehicle 12 might enter a state where the vehicle 12 will be at zero speed but not require the WED 52 to be engaged. It is still desirable to secure the vehicle (by re-engaging the WED 52) as safety is prioritized over efficiency.

Solutions to the first challenges will now be discussed. As will become appreciated herein with respect to FIGS. 2A-2F, the methods of the instant disclosure provide solutions to the first challenges. To ensure that the FAD 52 engages in most of the use cases at very low speeds, an interface is created where the vehicle 12 is "ready to go to park" at low vehicle speeds. It is ensured that the FAD 52 closing begins and attempts to close before the ePB 70 is engaged, because it can fail or re-try during this time period, before the electronic park brake 70 is applied and once the WED 52 is connected, the park pawl 66 can successfully get engaged. The supervisory controller 16 for the PRND will display "N", or "Not in Park", such as at the HMI 40. If there is a successful engagement of the FAD 52, the HMI 40 will display "Park". If the engagement of the FAD 52 has failed due to a fault or was unsuccessful, the HMI will blink "Park" to notify the vehicle operator that it was not able to engage park, but the vehicle 12 is secured through engagement of the ePB 70.

Second challenges will now be discussed. When the FAD/WED 52 is not engaged or faulted preventing a re-engagement, engaging the electronic park brake 70 as a remedial action is not enough as this opens other issues which might not be safe for the vehicle operator such as if the vehicle 12 is parked on a grade and/or in icy road conditions. There is a possibility that the vehicle 12 can gain momentum through the front wheels (freewheel such as on low coefficient of friction and or a grade) due to the failure of the FAD 52, despite the park lock engaged on the front axle, the electronic park brake 70 applied on the rear. The risk is otherwise prevented when the park pawl 66 engaged (with the FAD 52 connected) on the front axle and the electronic park brake 70 engaged on the rear axle.

Solutions to the second challenges will now be discussed. As will become appreciated herein with respect to FIGS. 2A-2F, the methods of the instant disclosure provide solutions to the second challenges. In case of a faulted condition, or in case where the FAD 52 cannot be successfully engaged with the ePB 70 in the applied state, there will be a new interface at the HMI 40 to warn the vehicle operator. In examples a warning message can include "Roads might be ICY, ensure that the vehicle is secured on a flat surface". The message can be initiated based on grade and temperature thresholds being reached (such as measured by vehicle sensors 80) where hazardous events such as a rollaway might occur event with the vehicle secured with the ePB 70.

Third challenges will now be discussed. The vehicle "OFF" or "Key OFF" management is controlled by the coordination of the RFHM 34. The RFHM controls the key in ignition module 30 to maintain the ignition status to "OFF" and is based on the vehicle 12 being in a "Park" position (park pawl 66 physically engaged and vehicle 12 not moving). In the example without the ePB 70, the vehicle 12 can still move and the vehicle cannot key "OFF" the vehicle as the vehicle is realistically in "Neutral" to adhere to "Key OFF" requirements. If the vehicle 12 cannot be "Keyed OFF" because the vehicle 12 is in "Neutral" will cause high voltage drain and finally a 12V decay as the ignition will stay in the "RUN" state, even after the vehicle operator presses the ignition button 38 to "Key OFF" the vehicle 12. In other challenges the FAD 52 requires ignition to be in "ON" state to continue performing the re-engagement process.

Solutions to the third challenges will now be discussed. As will become appreciated herein with respect to FIGS. 2A-2F, the methods of the instant disclosure provide solutions to the third challenges. By sending a "Neutral/Not in Park" state (can also be satisfied in "Reverse" or "Drive" without torque production) to the RFHM 34 during application of the ePB 70 or during re-engagement of the FAD 52, the RFHM cannot "Key OFF" the vehicle 12 until a "Park" state is received. Until then, the powertrain supervisory controller 16 for PRND will display "N" (such as on the HMI 40). If there was a successful engagement of the FAD 52, the HMI 40 will display "Park" to the vehicle operator. If the engagement of the FAD 52 has failed due to a fault or was unsuccessful, the HMI 40 will blink "Park" to the vehicle operator indicating that it was not able to engage park, the that the vehicle is secured through engagement of the ePB 70. Once the RFHM 34 receives the "Park" state, it can successfully "Key OFF" the vehicle 12. This will avoid high voltage and 12V drain and also give the vehicle operator an opportunity to drive the vehicle 12 for multiple key cycles after the WED/FAD 52 has failed to re-engage. In solutions to the FAD 52 requiring ignition to be in "ON" state, "Neutral/Not in park" until FAD 52 engagement will support the process of engagement.

Figure 2B:
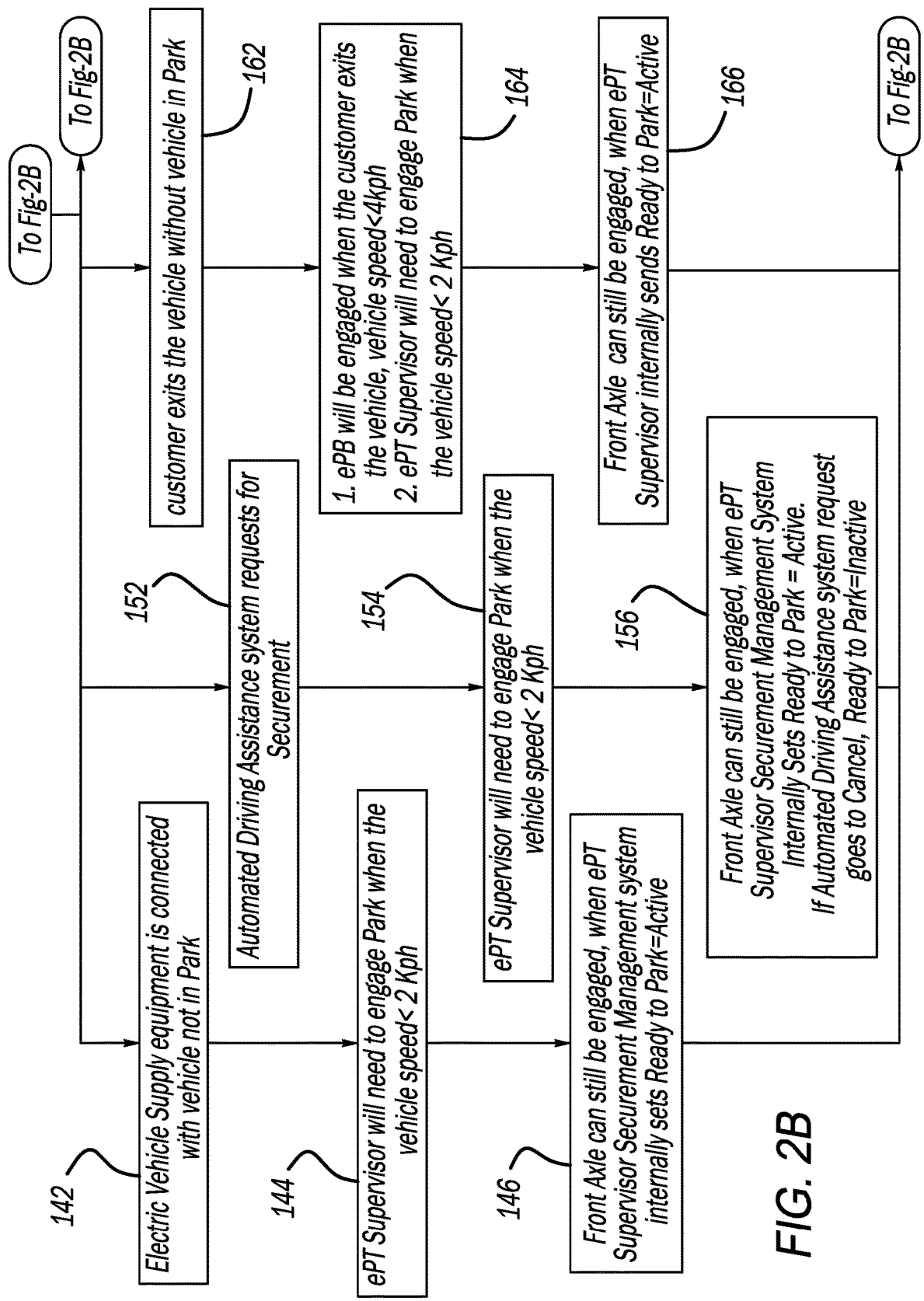
Figure 2D:
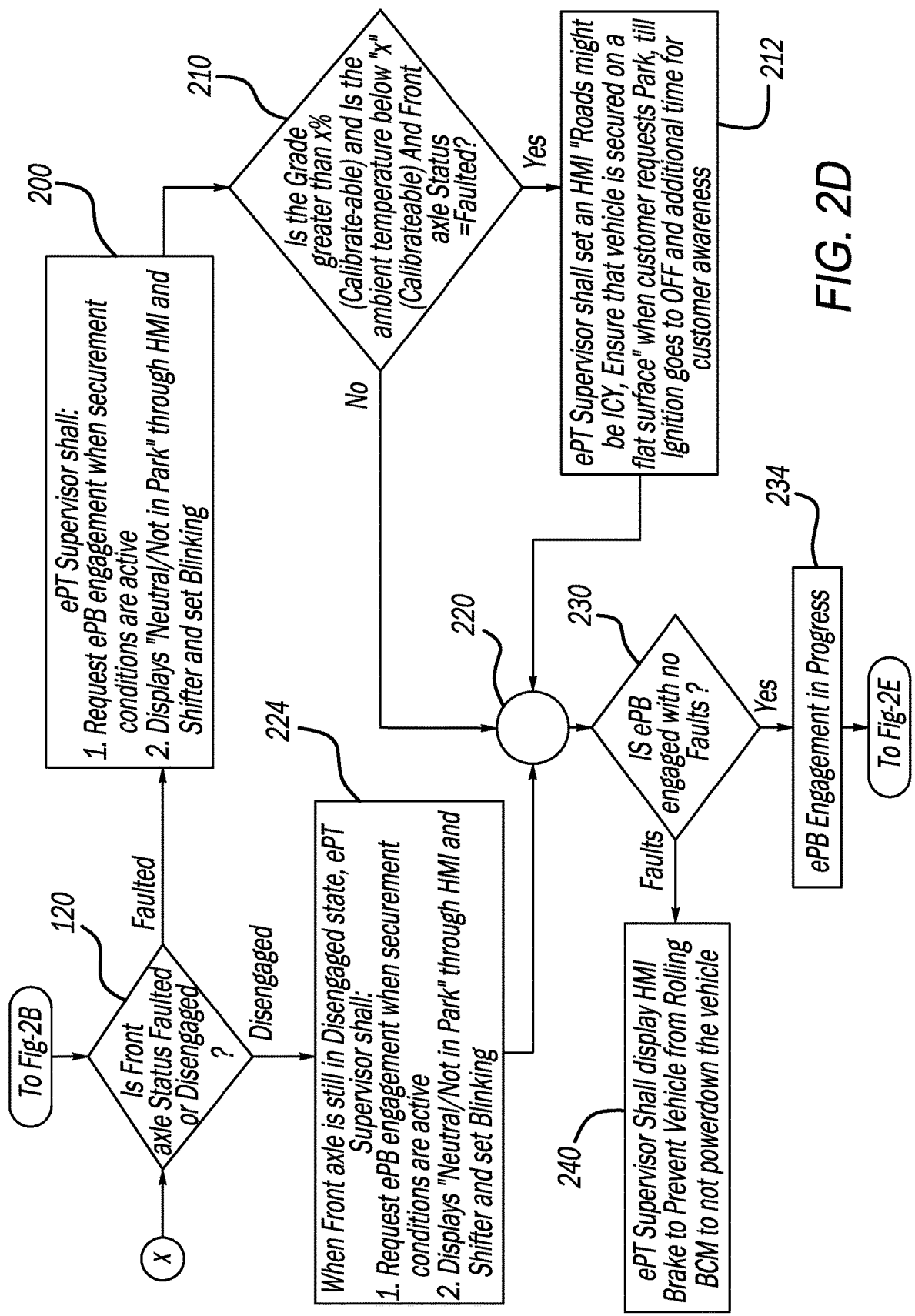
Figure 2E:
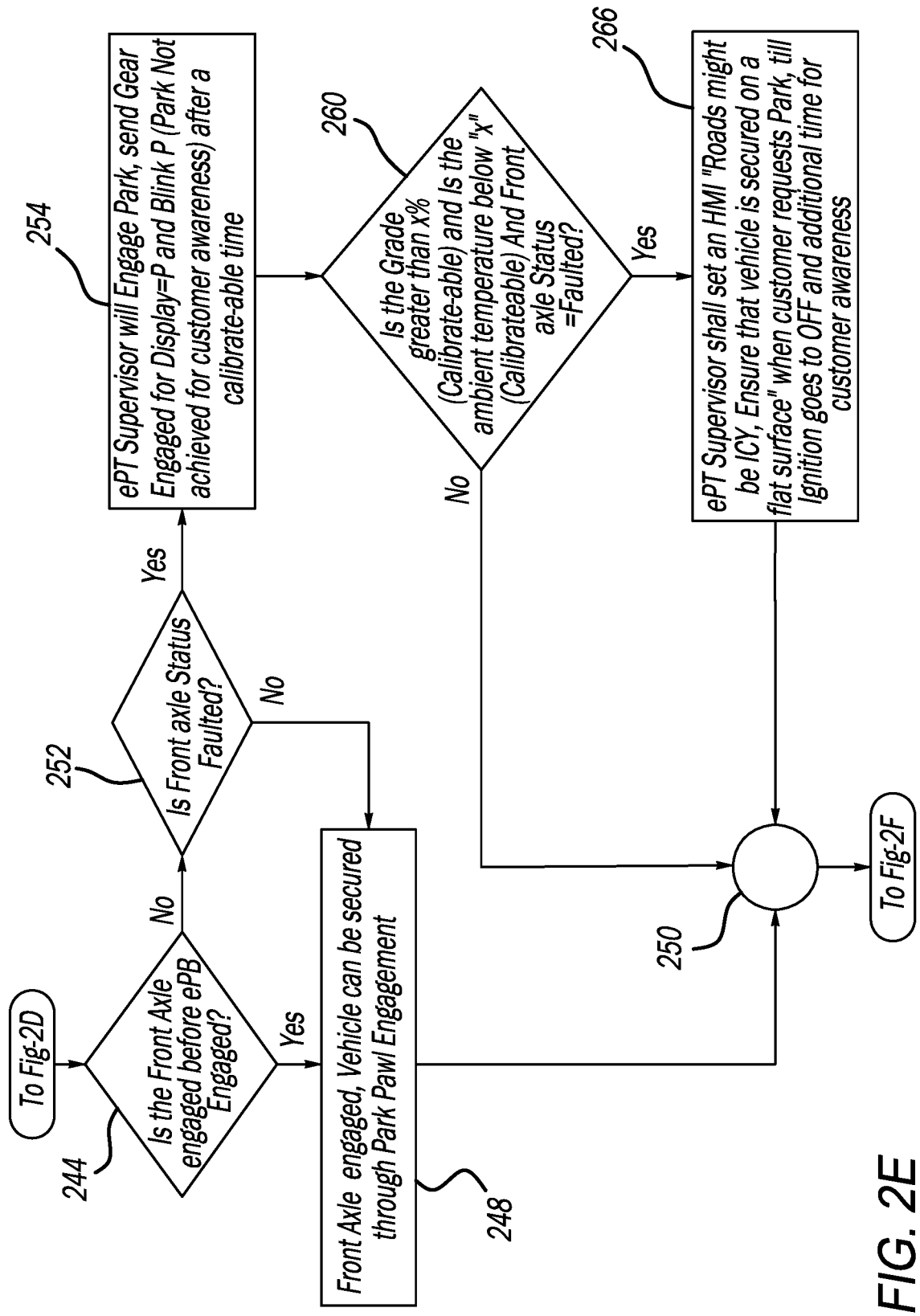
Figure 2F:
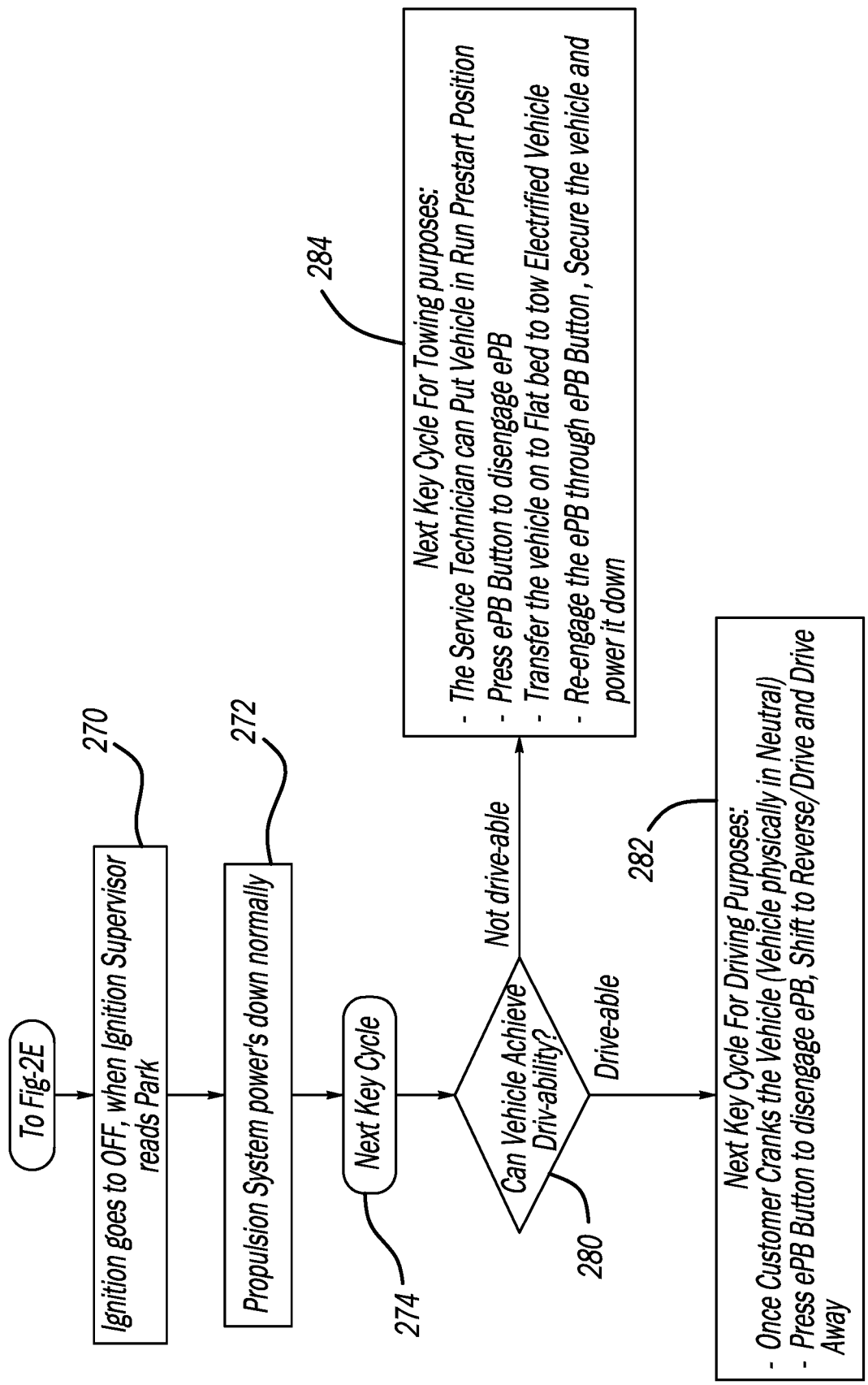

With particular reference now to FIGS. 2A-2F, a method 100 for operating the system 10, and addressing the identified challenges described above will be described. At 110, control determines whether the vehicle 12 is on, not in park and the front axle is disconnected. At 112 control determines if the front axle (e.g., such as the front axle disconnect 52) is faulted. If the front axle is faulted, control determines whether the front axle status is faulted or disengaged at 120 (FIG. 2D). If the front axle is not faulted at 112, control determines whether the customer has moved the shifter to park when the front axle is disengaged. If yes, control determines that the customer has engaged park with the front axle disengaged (rapid maneuver to come to a stop and request park) at 132 and proceeds to summer 134 at FIG. 2C. If control determines that the customer did not move the shifter to park when the front axle is disengaged at 130, the ePT supervisor 16 determines that it needs to secure the vehicle 12 due to an internal reason at 140

Various internal reasons will be described while referring to FIGS. 2B and 2C. At 142, electric vehicle supply equipment is connected with the vehicle 12 not in park. At 144, the ePT supervisor 16 will need to engage park when the vehicle speed is <a park engagement speed such as, but not limited to, 2 Kph. At 146, the front axle can still be engaged when the ePT supervisor controller 16 internally sets "Ready to Park=Active". At 152, automated driving assistance system requests for securement. At 154, ePT supervisor 16 will need to engage park when the vehicle speed is <the park engagement speed. At 156, the front axle can still be engaged when the ePT supervisor 16 automated driving assistance system requests for driving assistance system request goes to cancel and "Ready to Park=Inactive". At 162, customer exits the vehicle 12 without the vehicle in park. At 164, the ePB 70 will be engaged when the customer exits the vehicle 12 and the vehicle speed<an ePB engagement speed such as, but not limited to, 4 kph. The ePT supervisor 16 will need to engage park when the vehicle speed <2 kph. At 166, the front axle can still be engaged when the ePT supervisor 16 internally sends "Ready to Park=Active".

At 172 a loss of propulsion due to a propulsion system fault is identified. At 174, the ePT supervisor 16 will disable high voltage components (eMotor will be disabled). At 176, the front axle cannot be engaged as the propulsion system is not active, the ePT supervisor 16 internally sends "Ready to Park=Active". At 182, the customer presses the ignition button 38 to shut off the vehicle but with the vehicle 12 not in park. At 184, the ePT supervisor 16 will keep the high voltage components enabled. At 186 control determines if the vehicle 12 is in a car wash mod or park. If a car wash is determined, at 188 the front axle should still be disengaged because the customer can re-crank at any time, "Ready to Park=Inactive". Each of these internal reasons loops to the summer 134.

If control determines that the front axle status is faulted at 120, the ePT supervisor 16, at 200, requests engagement of the ePB 70 when securement conditions are active. A message such as "Neutral/Not in Park" or "Park on Shifter and Cluster is not Achieved" or "the vehicle not in park condition" is displayed through the HMI 40 and the shifter is set blinking. At 210 control determines whether the grade is greater than a threshold (such as x %) and the ambient temperature is below a threshold (such as x degrees) and the front axle status is faulted. If no, control loops to summer 220. If yes, the ePT supervisor 16, at 212, sends a message to the HMI 40 such as "Roads might be ICY, Ensure that vehicle is secured on a flat surface" when the customer requests park, until the ignition 30 goes to OFF and additional time for customer awareness. Control loops to summer 220.

If control determines that the front axle status is disengaged at 120, the ePT supervisor 16, at 224, requests engagement of the ePB 70 when securement conditions are active. A message such as "Neutral/Not in Park" is displayed through the HMI 40 and the shifter is set blinking. Control loops to summer 220.

At 230, control determines if the ePB 70 is engaged with no faults. If yes, the engagement of the ePB 70 take place such as between a threshold time at 234. By way of non-limiting example, the threshold time can be 1.2-1.5 seconds. If faults are determined at 230, the ePT supervisor 16 sends a message to the HMI 40 such as "Brake to prevent vehicle rolling" and the vehicle 12 is not powered down.

At 244 control determines whether the front axle is engaged before the ePB 70 is engaged. If no, control determines whether the front axle status is faulted at 252, if yes, the ePT supervisor 16, at 254, engages park, sends gear engaged for display=park and blinks "P" (park not achieved for customer awareness) after a calibrate-able time. At 260 control determines whether the grade is greater than a threshold (such as x %) and the ambient temperature is below a threshold (such as x degrees) and the front axle status is faulted. If no, control loops to summer 250. If yes, the ePT supervisor 16, at 266, sends a message to the HMI 40 such as "Roads might be ICY, Ensure that vehicle is secured on a flat surface" when the customer requests park, until the ignition 30 goes to OFF and additional time for customer awareness. Control loops to summer 250. If control determines that the front axle is engaged before the ePB 70 is engaged at 244, the vehicle 12 can be secured through engagement of the park pawl 66 at 248.

At 270 the ignition goes to OFF when the ignition supervisor 30 reads park. At 272 the propulsion system powers down normally. At 274 a subsequent key cycle is identified. At 280 control determines if the vehicle 12 can achieve drivability. If no, the next key cycle for towing purposes is identified at 284. In examples, the service technician can put the vehicle 12 in a run prestart position. The ePB button can be pressed to disengage the ePB 70. The vehicle 12 can be transferred to a flatbed to be towed. The ePB 70 can be re-engaged through the ePB button. The vehicle can be secured and powered down. If control determines that the vehicle 12 can achieve drivability at 280, the next key cycle for driving purposes are identified at 282. Once the customer cranks the vehicle 12 (vehicle physically in neutral), the ePB button can be pressed to disengage the ePB 70, the vehicle 12 can be shifted in to reverse or drive and be driven away.

It will be appreciated that the term "controller" as used herein refers to any suitable control device(s) that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A method of operating an electrified vehicle having a front axle disconnect, the method comprising:
   determining, at a powertrain supervisor controller, that the electrified vehicle needs to be secured due to an internal vehicle reason;
   determining, at the powertrain supervisor controller, whether a front axle status is one of faulted or disengaged;
   requesting, by the powertrain supervisor controller, and based on the front axle status being faulted, engagement of an electronic park brake when securement conditions are active;
   displaying, at a human machine interface, a message indicative of "the vehicle not in park condition";
   receiving, at the powertrain supervisor controller, signals from sensors indicative of one of a grade and a temperature;
   determining, at the powertrain supervisor controller, whether the grade is above a grade threshold and the temperature is below a temperature threshold; and
   displaying, at the human machine interface, a message indicative of icy roads instructing the electrified vehicle to be parked on a flat surface, based on the determining that the grade is above the grade threshold the temperature is below the temperature threshold.

2. The method of claim 1, further comprising:
   determining, at the powertrain supervisor controller, whether the front axle is engaged before the electronic park brake is engaged;
   engaging park, at the powertrain supervisor controller; and
   displaying, at the human machine interface, a message indicative of "park status not achieved".

3. The method of claim 2, further comprising:
   requesting, by the powertrain supervisor controller, and based on the front axle status being disengaged, engagement of the electronic park brake when securement conditions are active; and
   displaying, at the human machine interface, a message indicative of "the vehicle not in park condition".

4. The method of claim 3, further comprising:
   determining, at the powertrain supervisor controller, whether the electronic park brake is engaged with no faults; and
   displaying, at the human machine interface, based on a fault being determined, a message indicative of "braking the vehicle to prevent the vehicle from rolling".

5. The method of claim 1, wherein the internal reason comprises electric vehicle supply equipment connected to the electrified vehicle while not in park.

6. The method of claim 1, wherein the internal reason comprises an automated driving assistance system requests for securement.

7. The method of claim 1, wherein the internal reason comprises a vehicle operator exits the electrified vehicle without the electrified vehicle in park.

8. The method of claim 1, wherein the internal reason comprises a loss of propulsion due to a propulsion system fault.

9. The method of claim 8, wherein the internal reason comprises a vehicle operator presses ignition to shut off the electrified vehicle with the electrified vehicle out of park.

10. A control system for operating an electrified vehicle, the control system comprising:
    a front axle disconnect that selectively engages and disengages relative to a front drive axle of the electrified vehicle;
    a human machine interface configured to display messages to a vehicle operator based on operating status of the front axle disconnect;
    an electronic park brake;
    sensors including a grade sensor that senses a grade and a temperature sensor that senses a temperature; and
    a powertrain supervisor controller configured to:
       determine that the electrified vehicle needs to be secured due to an internal vehicle reason;
       determine whether a status of the front axle disconnect is one of faulted or disengaged;
       request, based on the front axle disconnect status being faulted, engagement of the electronic park brake;

communicate a signal to the human machine interface to display a message indicative of "the vehicle not in park condition";

receive the sensed grade and temperature; and display, at the human machine interface, a message indicative of icy roads instructing the electrified vehicle to be parked on a flat surface, based on the sensed grade being above a grade threshold and the sensed temperature being below a temperature threshold.

11. The control system of claim 10 wherein the powertrain supervisor controller determines whether the front axle disconnect is engaged before the electronic park brake is engaged and communicates a signal to the human machine interface to display a message indicating of "park status not achieved".

* * * * *